Nov. 8, 1960        D. R. ZUCK        2,959,373

CONVERTIPLANE

Filed Dec. 10, 1954        9 Sheets-Sheet 1

INVENTOR
Daniel R. Zuck

INVENTOR.
Daniel R. Zuck

INVENTOR.
Daniel R. Zuck

United States Patent Office 2,959,373
Patented Nov. 8, 1960

---

2,959,373

CONVERTIPLANE

Daniel R. Zuck, 14273 Beaver St., San Fernando, Calif.

Filed Dec. 10, 1954, Ser. No. 474,558

4 Claims. (Cl. 244—7)

My invention relates to aircraft referred to as convertiplanes, and more particularly to certain new and useful improvements in aircraft which are capable of vertical takeoff and landing at zero horizontal velocity, and which are capable of horizontal cruising flight similar to the conventionally winged type airplanes.

This application is a continuation-in-part of my copending application Serial Number 310,607, filed September 20, 1952, for a Helicopter Rotor, and issued to me January 8, 1957, as U.S. Patent Number 2,776,718.

The conventionally winged type airplane is a very efficient vehicle for cruising flight, but it is handicapped by the relatively high horizontal speeds that are necessary to land the airplane. The conventional helicopter in the present state of the art can takeoff and land vertically at zero forward velocity but it suffers badly in efficiency in horizontal flight. Moreover the top speeds and cruising speeds of the helicopter in the foreseeable future are inherently limited to about 150 nautical miles per hour. Also, due to the complexity of its mechanisms, the operational costs and the maintenance costs of the helicopter are prohibitive.

Therefore, the primary object of this invention is to provide an aircraft with a means to takeoff and land vertically at a zero horizontal velocity and, after having climbed to a cruising altitude, provide a means to convert to the relatively more efficient horizontal flight means similar to the typically winged type airplane.

Another object of this invention is to incorporate into one vehicle the essential hovering and takeoff and landing characteristics of the helicopter, and the efficient and high speed horizontal flight characteristics of the conventional airplane.

Another object of this invention is to combine the basic essentials of the helicopter with the fundamentals of the classical airplane, thereby resulting in an aircraft capable of vertical takeoff and landing at zero horizontal velocity and hovering, and also capable of efficient high speed cruising speed.

Another object of this invention is to combine the basic helicopter with the fundamentals of the classical airplane, thereby resulting in an aircraft with greater safety and reliability by virtue of its ability to fly at will either characteristically as an airplane or characteristically as a helicopter; and to fly as an airplane except for takeoff and landing, relieving the complicated helicopter functional units of continuous operation and thus inherently increasing the vehicle's service life by virtue of the considerably higher reliability and service life of the classical airframe airplane flight components.

Another object of this invention is to combine the functional flight units of the helicopter and the functional flight units of the airplane into a compatible form, and the resulting aircraft having the ability to takeoff and land vertically at zero horizontal velocity and to hover and to convert to conventional airplane flight with the functional helicopter units inactive, thereby reducing drag, increasing reliability, and increasing the aircraft's cruising speed.

There are many problems associated with the combining of the classical helicopter with the classical airplane. Aside from the increased complexity of the resulting vehicle, there are additional problems of: increased weight, certain seemingly incompatible aerodynamic control problems in transition from helicopter flight to airplane flight, and vice versa, and the problems of the disposition of the helicopter rotors during the airplane flight period. To date helicopter rotors used or proposed for use in convertiplanes have been permitted to free-wheel in the minimum drag pitch when the rotor is not used to support the vehicle during cruising flight.

Therefore, another object of this invention is to provide a means to feather the helicopter lifting rotor into a stationary longitudinal position, and thereby projecting a minimum frontal area to the cruising flight of the aircraft, and the utilization of the anti-torque rotor as a propeller for the airplane cruising flight.

Another object of this invention is to provide interchangeable means to use a common power plant for helicopter flight and conventional airplane flight.

How the foregoing objects and advantages are secured together with others which will occur to those skilled in the art, will be more apparent from the following description making reference to the accompanying drawings, in which:

The helicopter and the conventional fixed wing airplane are fundamentally incompatible. The efficient high speed cruising of the airplane, made possible by the fixed wing rigidly attached to an airplane fuselage, does not lend itself aerodynamically to the vertically ascending and descending ability derived from an overhead helicopter rotor. The helicopter rotor usually produces a downward flow of air with respect to the fuselage and a fixed wing requires an airflow relatively parallel to the airplane fuselage. Herein is one of the basic problems in adapting a helicopter rotor to the fixed wing airplane.

Another problem in combining the helicopter rotor with the airplane is the inherent problem of feathering and stopping the helicopter rotor, and the difficulty of carrying the helicopter rotor stationary in the airstream in the minimum drag attitude when the aircraft flies as a conventional airplane.

The conventional helicopter rotor with its universal blade hinging does not present an airfoil that may be feathered, stopped, and stowed in a minimum drag attitude in the airstream in the conventional airplane flight.

Another problem in combining the helicopter rotor with a winged airplane is the application and direction of the engine power interchangeably to the helicopter rotor and to the airplane propeller. In helicopter flight the engine power is directed to the helicopter main lifting rotor and the anti-torque rotor simultaneously; and during airplane flight the engine power is directed to the airplane propeller only.

Another problem, which is perhaps the greatest problem of all, and is perhaps the one great problem which has no obvious solution and is ignored in the majority of convertiplane disclosures made to date, is the absolute pilot controllability of the vehicle at all times during its transition from helicopter flight to airplane flight and vice versa.

Through the application of these herein disclosed new and ingenious means and combinations of devices hitherto unknown, I have succeeded in combining the helicopter and the airplane successfully and have solved the above noted problems.

The problem of the downward flow of air from the helicopter rotor conflicting with the fixed wing I have solved by using a freely floating wing which I have patented in my Patent No. 2,347,230. I have solved the problem of stopping the rotor and feathering it in flight by the use of a rotor which I have disclosed in my patent application No. 310,607, dated September 20, 1952, for Helicopter Rotor, now Patent No. 2,776,718. And I have utilized my Directional Propeller Control invention in my Patent No. 2,420,764 to partially solve the problem of the engine interchangeable power application to the tail rotor and the propeller. Additional novelty of my invention will be apparent in the further examination of the drawings and the description of the specification.

Figure 1:
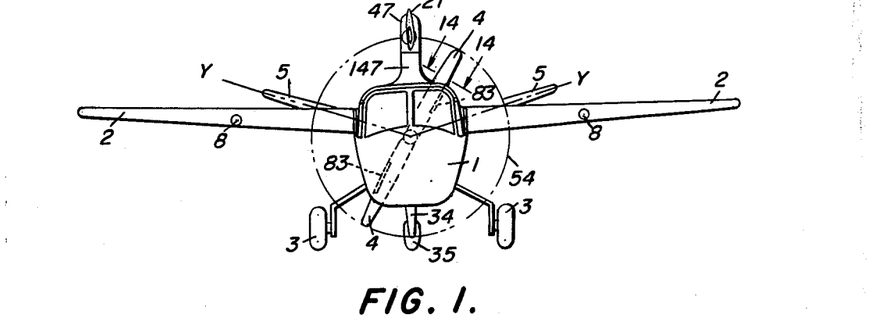
Figure 1 is a front view of the aircraft.

In referring to Figure 1, which is a front view of my convertiplane in completely assembled form, my proposed aircraft is strikingly conventional in appearance. It has a conventional body 1 with the propeller 4 at the rear of the said body 1, and a pylon support 147 for the helicopter rotor of which the blades are designated as 21, and the said blades 21 are shown in the feathered position for the higher speed cruising flight of the aircraft. The aircraft's longitudinally stabilizing airfoils 5 are mounted on an axis to the fuselage 1 designated by Y—Y.

Figure 2:
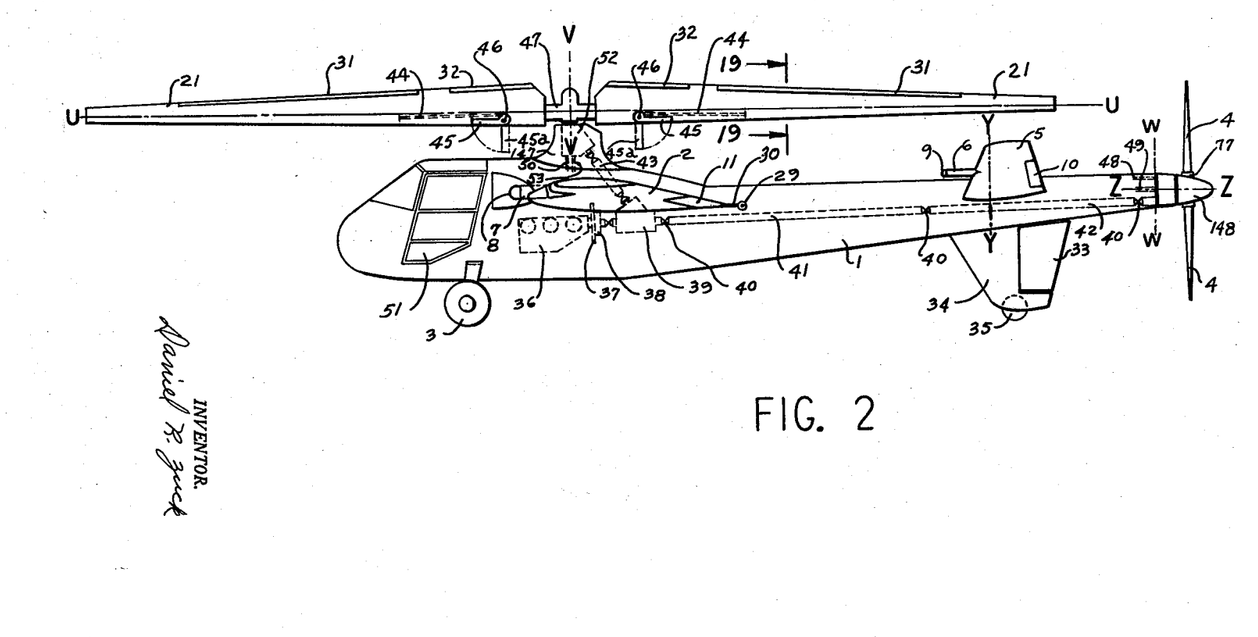
Figure 2 is a side view of the aircraft.

In referring to Figure 2 my proposed aircraft in the side view is disclosed in greater detail. The combination of the helicopter features and airplane features are obvious in this view. The main lifting rotor consisting essentially of the blades 21 and hub 47 are shown feathered about the blade pitching axis U—U and about the vertical rotation axis V—V, and the said rotor is supported on the pylon 147.

In the said Figure 2 is further disclosed the correlation of the wings 2, the fuselage 1, the stabilizers 5, and the propeller assembly made up of the blades 4 and the hub 77 and the fairing 148. On the underside of the fuselage is located the conventional fin 34 and the hingedly mounted rudder 33. The said fin 34 is fixedly secured to the fuselage 1 and the said fin 34 serves as a support structure for the tail wheel 35. The forward wheels 3 are supported by a gear structure at the fore part of the fuselage.

At the tail of the fuselage 1 is located the above said propeller assembly which rotates on the axis Z—Z. Thru the axis Z—Z passes the axis W—W normal to the said axis Z—Z. The said axis W—W permits the entire said propeller assembly and its rotation axis Z—Z to rotate 90 degrees into the plane of the paper, permitting thereby the propeller 4 to revolve in the plane of the paper as is further illustrated in the Figure 3.

Further in the Figure 2 is disclosed the general outline and the relationship of the engine and the lifting rotor and the propeller driving assembly. Item 36 outlines the engine configuration. Item 37 is the flywheel and 38 is the clutch. The engine power by means of a torque shaft passes into the gear box 39 which has separate torque shaft outlets to the tail propeller and the lifting rotor. The shaft to the lifting rotor carries the power to the gear box 52 which also supports the rotor hub 47 and allows the said rotor 4 to rotate on the vertical axis V—V.

By the means of shafts 41, 42, and the universals 40 the engine torque power is transferred from the said gear box 39 to the propeller hub assembly.

Figure 3:
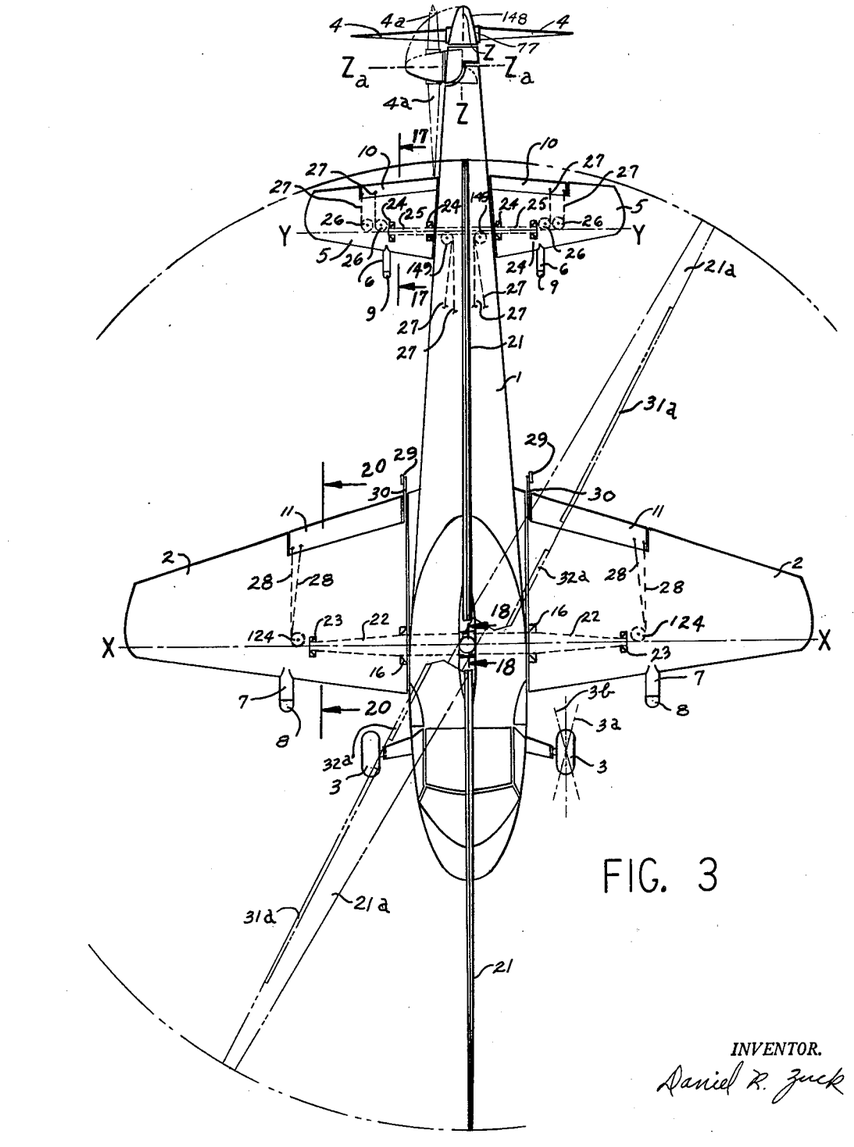
Figure 3 is a plan view of the aircraft.

In Figure 3 is shown the convertiplane in the plan view and discloses additional details of the convertiplane. The axis Z—Z here is shown as the propeller rotation axis and the axis Za—Za shows the axis Z—Z rotated to the anti-torque rotor position for helicopter flight. The greater detail of the horizontal stabilizers 5 here discloses the stabilizer pivoting support shaft 25 which is hollow. The said shaft 25 is fixedly secured to the fuselage 1. The stabilizer 5 is hingeably secured to the said shaft 25 on the bearings 24.

The stabilizer 5 is statically balanced on the shaft 25 by means of the counterweight 9. The said counterweight 9 consists of a very dense metal and is secured to the support arm 6 to provide adequate leverage on the pivoting axis Y—Y to statically balance the said stabilizer 5.

To the trailing edge of the stabilizer 5 is hingeably attached an aerodynamic control surface 10. The said control surface 10 is moveable by means of the flexible control wires 27, which by means of the pulleys 26 are guided thru the shaft 25, and into the fuselage 1 by means of the pulleys 149.

The support of the wings 2 is also shown in greater detail. The shaft 22 which is hollow is fixedly secured to the fuselage 1, and the wings 2 are hingeably supported on the said shaft 22 by means of the bearings 16 and 23. The pivot axis X—X of wings 2 passes through the center of the shaft 22. A counterweight 8 of high density metal is fixedly secured to the support arm 7 which in turn is fixedly secured to the wing 2. The said counterweight 8 is of a size and weight and has a leverage arm sufficient to statically balance the wing 2 on the shaft 22. To the trailing edge of the wing 2 is attached the aerodynamic control surface 11. The said control surface 11 is moveable thru the flexible control cables 28. The said cables 28 are guided into the hollow shaft 22 by means of the pulleys 124 and are led into the fuselage 1.

The trailing edges of the wings 2 are protected by means of the bumper wheels 29 which rotatably attach to the support arm 30. The said supports 30 are fixedly secured to the wings 2. The said bumper wheels 29 prevent the wing trailing edges from damage on the ground when the wings 2 are rotated on the axis X—X.

In the Figure 3 the wheels 3 are on the forward part of the fuselage 1. The said wheels 3 are freely castering of the known variety and are capable of rotating to the positions 3a and 3b or intermediate positions.

In Figure 3 the rotor blades 21 are shown feathered in the fore and aft position parallel to the centerline of the fuselage 1. The said rotor blades 21 are also shown in the unfeathered position 21a in phantom outline.

Figures 11, 12, 15:
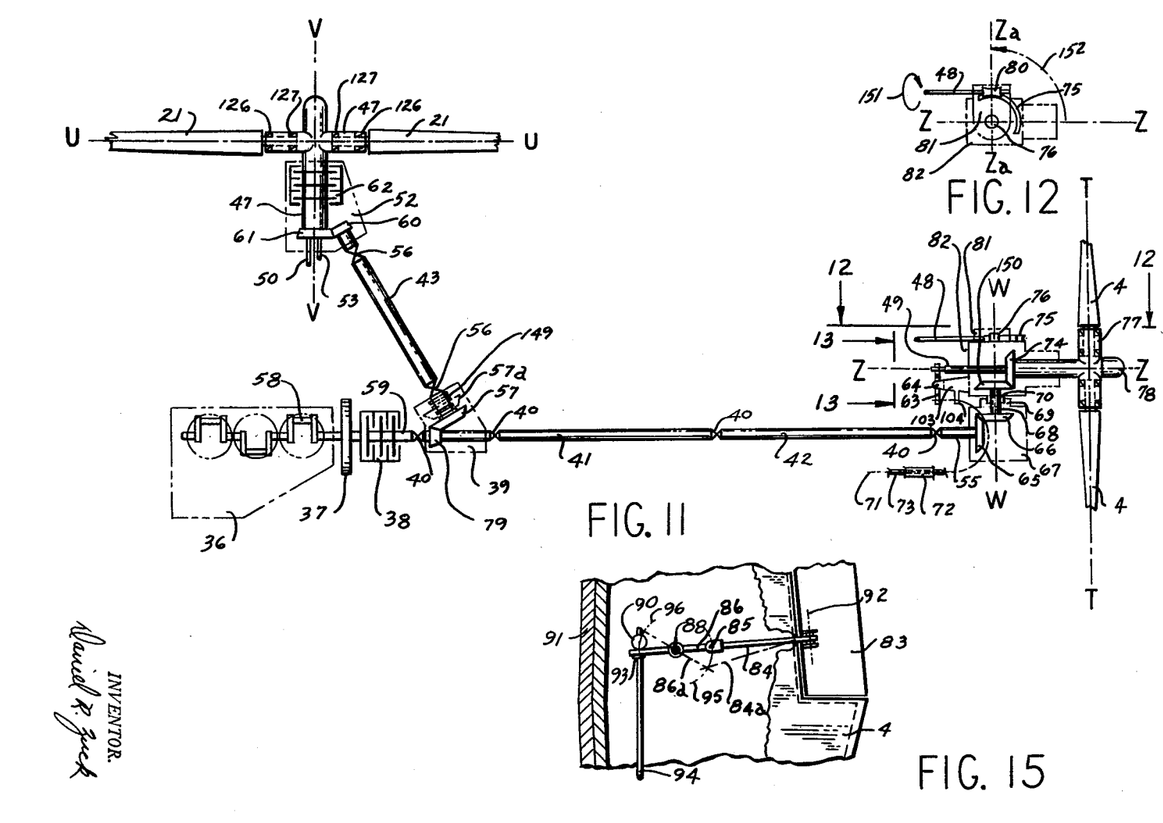
Figure 11 is a diagrammatical view of the rotor and propeller driving mechanism.
Figure 12 is a diagrammatical view taken on the line 12—12 in the Figure 11.
Figure 15 is a sectional view taken on the line 15—15 in Figure 14.

In Figure 11 is disclosed the fundamental elements of the mechanism to power and drive the lifting rotor and the tail propeller. Within the engine 36 is the engine crankshaft 58. To the crankshaft 58 is securely attached the flywheel 37, and to the said flywheel is connected the releasable clutch 38. A stub shaft 59 and universal 40 connects to the bevel gear 79 within the gear housing 39. The said gear 79 intermeshes with a slideable bevel gear 57. The said gear 57 is slideable to the position of the gear at 57a. A stub shaft 149 is keyed to the slideable gear 57, and the said shaft is connected to the shaft 43 and the bevel gear 60 within the gear housing 52 by means of the universal joints 56. The said bevel gear 60 intermeshes with a bevel gear 61. The said gear 61 is fixedly keyed to the rotor hub shaft 47. Integrated with the said rotor shaft 47 are the elements of a brake 62 utilized to lock and hold the rotor in the stationary feathered position, and to retard the rotation of the rotor as required for feathering the rotor. The rotation of the said rotor shaft 47 is on the axis V—V. The said brake 62 is also within the gear housing 52.

In the Figure 11 the stub shaft is integral with the gear 79 and protrudes outward from the gear housing 39 to connect to the shaft 41 by means of the universal 40. The shafts 42 and 55 and the universals 40 further interconnect the shaft 41 with the bevel gear 65 within the gear housing 67. The said gear 65 intermeshes with a bevel gear 66 which is fixedly secured to the shaft 68. The said shaft 68 rotates on the axis W—W. To the said shaft 68 is fixedly secured the bevel gear 150. The said bevel gear 150 intermeshes with the bevel gear 74. The said gear 74 is fixedly secured to the shaft and propeller hub 77. The said shaft 77 rotates on the axis Z—Z. The said shaft 77 also rotates within the housing 82. The said housing 82 further has a journal 70 protruding into a journal box 69 permitting the housings 67 and 82 to turn separatively with respect to each other on the axis W—W. The said housing 82 also has a journal 76 protruding into the housing 81. The said housings 81 and 67 are fixedly secured to the fuselage 1 and the attachments to the said fuselage 1 are not shown in the drawings.

In Figure 12 is a fragmental view taken on the line 12—12 in Figure 11. In the said Figure 12 is shown a segment of a worm gear 75 which is fixedly secured radially about the journal 76 to the housing 82. Intermeshing with the said segmental worm gear 75 is the worm 80. And the said worm 80 is fixedly secured to the shaft 48, and the said worm 80 and shaft 48 are journaled into the housing 81.

The said shaft 48 may be turned clockwise as shown by the arrow 151 to rotate the worm segment 75 and axis Z—Z in the direction of the arrow 152 until the axis Z—Z lines up with and becomes the axis Za—Za. In this position the propeller rotation axis has been rotated 90 degrees with respect to the fore and aft axis of the fuselage 1. When the propeller rotates on the axis Za—Za, the said propeller serves as an anti-torque rotor to compensate for the torque of the large lifting rotor.

Figures 11 and 12 disclose features which are similar to those in my Patent No. 2,420,764. The shaft 79 in the Figure 3 of the said patent is equivalent to the shaft 48 in the Figure 12 of this disclosure. The worm 78 in the Figure 3 of the said patent is equivalent to the worm 80 in the Figure 12 of this disclosure. The worm gear segment 75 in the Figure 3 of the said patent is equivalent to the worm gear segment 75 in this disclosure. The journal 70 in Figure 3 of the said patent is equivalent to the journal 76 in Figures 11 and 12 in this disclosure. The shaft 34 in Figure 3 of the said patent is equivalent to the shaft 68 in Figure 11 of this disclosure. Also the bevel gear 33 in Figure 3 of the said patent is equivalent to the bevel gear 150 in the Figure 11 of this disclosure.

To permit the propeller to function as an anti-torque rotor some means to vary the propeller blade angle must be provided. The origin of this means, of course, leads to the pilot's cockpit. But since these controls in the cockpit are conventional they are not shown here. The centerline of this control in the fuselage 1 is shown as 71 in Figure 11. The said centerline 71 is the center of the control wire 73 which is shown in fragmental form. The control wire 73 is encased within a flexible metal tube 72. The control wire 73 continues on the centerline 71 to the control lever 63 and is fixedly secured thereto. The flexible tube 72 also continues on the centerline 71 enclosing the said control wire 73 and attaching to the support 104. The said flexible metal tube 72 terminates at the support and is fixedly secured thereto.

Figure 13:
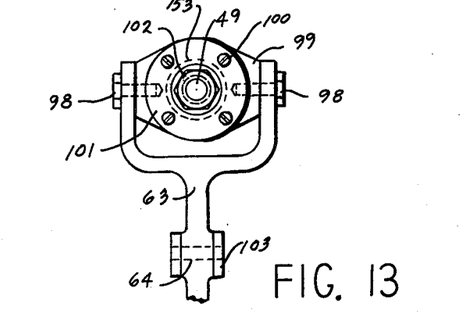
Figure 13 is a fragmental view taken on the line 13—13 in the Figure 11.

The lever 63 is rockably supported on the pin 64 shown in the Figures 11 and 13. Movement of the flexible control wire 73 within the flexible tube 72 transmits a rocking motion to the lever 63 about the pin 64.

The lever 63 is secured to the push-pull rod 49. The manner in which these two members are joined is shown in the Figure 13 which is taken on the line 13—13 in the Figure 11. The push-pull rod 49 has a threaded end which projects thru the bearing 153 and the said push-pull rod 49 is clamped to the bearing 153 by means of the nut 102. The said bearing 153 is clamped within the yoke 99 by means of the retainer plate 101. The retainer plate in turn is secured to the said yoke 99 by means of the four screws 100 which engage tapped holes in the yoke 99. The yoke 99 is swingably attached to the lever 63 by means of the forked ends on the said lever 63 thru the bolts 98 which engage tapped holes in the yoke 99.

Figure 16:
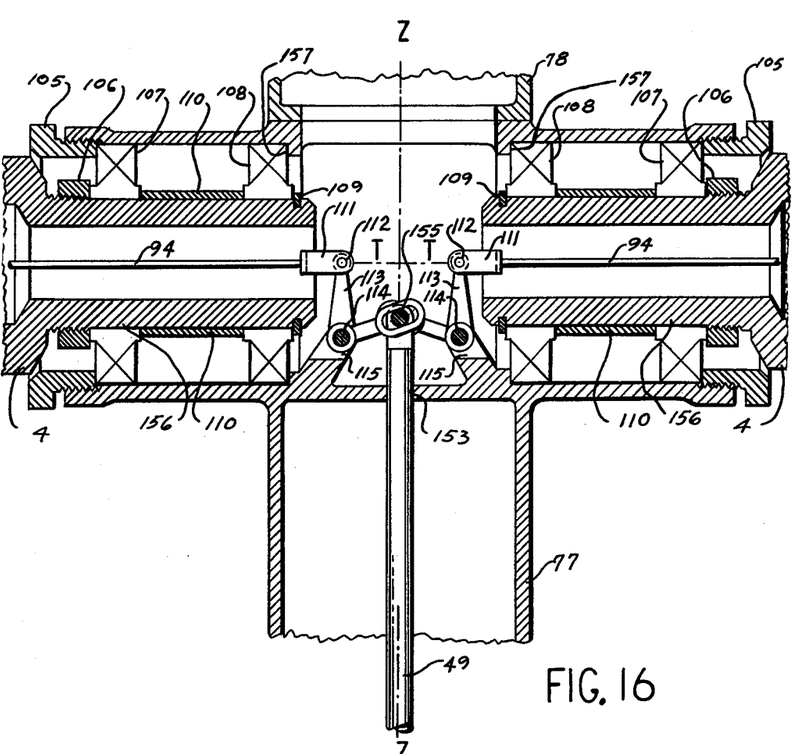
Figure 16 is a sectional view taken on the center line of the tail propeller shaft and thru the centerline of the blade incidence rotation axis.

In the Figure 16 the push-pull rod 49 continues into the hub 77 and is centered on the axis Z—Z by the hole 153. The said rod 49 engages two levers 113 by means of the pin 155 which passes thru the said two levers 113 and the said push rod 49. The levers 113 are rockably pinned to the shaft hub 77 at the support 115 by means of the pins 114. The said levers 113 are rockably pinned to the clevises 111 by means of the pins 112.

The clevises 111 are securely fixed to the control rods 94. The said rods 94 lead to a bell crank 86 in the Figure 15. The said control rod 94 passes thru the washer 93, the end of the bell crank 86, and thru the ball shaped weight 90. The said weight 90 and the said washer 93 are swaged on to the rod 94 confining the bell crank 86 between 90 and 93. A motion therefore in the rod 94 is transmitted to the end of the bell crank 86. The bell crank 86 is rockably supported on the pin 88, and the pin 85 connects the said bell crank 86 to the control rod 84. The said control rod 84 is hingeably pinned by means of a pin on the line 92 to the propeller control surface 83. Movement of the bell crank 86 about the pin 88 in the arcs 95 and 96 moves the push rod 84 to the position 84a and forces a movement of the control surface 83.

Figure 14:
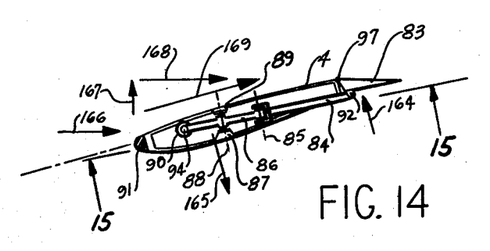
Figure 14 is a sectional view taken on the line 14—14 in the Figure 1.

In Figure 14 is disclosed the brackets 87 and 89 which are integral with the blade body 4. The said brackets 87 and 89 support the bell crank 86 on the pin 88. In the above said figure and in the Figure 15 the counterweight 91 is shown. The said counterweight 91 is fabricated from lead or a similar metal of high density to statically balance the blade assembly in its entirety, including 83 and 4, about the axis T—T in the Figure 16 which is co-axial with 94 in the Figure 14. The control surface 83 is swingably attached to the blade body 4 by means of the piano hinge 97.

In the Figure 16 it is noted that the inboard end of the propeller blade 4 shapes into a shaft which protrudes toward the centerline Z—Z of the hub 77. The said blade 4 with its inboard shaft 156 has a circumferential groove at its inboard end to receive the expansible lock ring 109. The said lock ring 109 bears against the bearing 108, and the said bearing 108 bears against the spacer sleeve 110. The nut 106 engages mating threads on the shaft 156 and clamps the bearing 107, the sleeve 110 and the bearing 108 against the lock ring 109. Thus the blade 4 and shaft 156 and bearing assembly are clamped into the hub 77 by means of the nut 105 which causes the bearing 108 to bear against the shoulder 157. The blade 4 therefore freely floats on the axis T—T by means of its support on the bearings 107 and 108.

Figure 17:
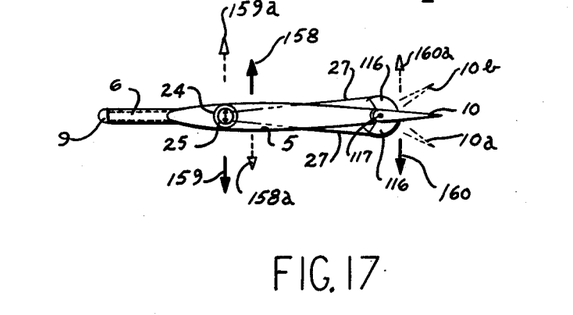
Figure 17 is a sectional view taken on the line 17—17 in the Figure 3.

In Figure 17 is disclosed the balancing and aerodynamic control means of the longitudinal controlling surface 5. The control surface 5 is composed of a symmetrical airfoil which is swingably supported on the substantially lateral shaft 25 by means of the bearings 24. The lateral shaft 25 is fixedly secured to the fuselage structure at the tail of the aircraft.

A counterweight 9 is supported by the means of the tubular structure 6 to statically balance the said airfoil 5 on the said shaft 25. A tab control surface 10 is hingeably supported on the trailing edge of the airfoil 5 on the hinge axis 117. The flexible control cables 27 are anchored to the said tab control surface 10 thru the quadrants 116 radially supported about the hinge axis 117 and fixedly secured to the said tab control surface 10.

The flexible control cables 27 are guided into the center of the shaft 25 by means of the pulleys 26, and into the fuselage forward to the pilot's compartment by means of the pulleys 149.

In Figure 17 are shown the numerical positions of 10a and 10b which represent the directions of movements of the control surface 10 through the actuation of the flexible control cables 27.

Figure 20:
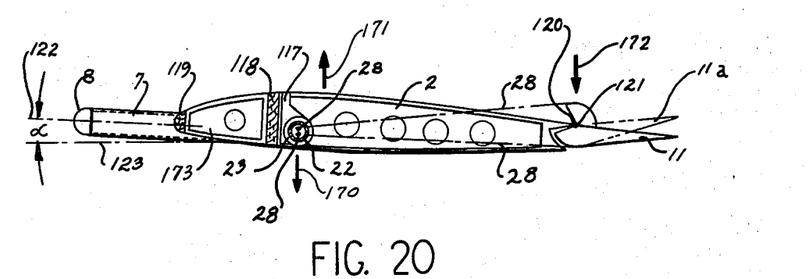
Figure 20 is a sectional view taken on the line 20—20 in the Figure 3.

In Figure 20 is shown the sectional view of the wing airfoil 2 and its elements of static balance and controlling means and the structural support. The said wing 2 is swingably supported by the means of the lateral shaft 22. The said shaft 22 is hollow and is fixedly secured to the fuselage 1. By means of the bearing 23 the wing 2 is swingably supported on the said lateral shaft 22. The structural fitting 117 is a housing for the said bearing 23 and connects to the wing structural spar 118. The said spar 118 is the main spanwise load carrying member. A forward spar 119 with the nose section rib 173 and including the structural wing covering completes the wing torsion box.

The wing 2 is statically balanced about the lateral shaft 22 by means of the counterweight 8 which is composed of a high density metal. The said counterweight 8 is attached to a lever consisting of a hollow metal tube 7, and the said tube 7 is securely fixed to the wing 2.

The aerodynamic control surface 11 is swingably attached to the wing 2 by means of the piano type hinge 121. Control movements of the surface 10 are obtained thru the flexible control cables 28 which are secured to the control horn 120, and the said horn 120 is securely fixed to the control surface 11. The said control cables 28 lead to the center of the hollow shaft 22 and are directed into the said hollow shaft 22 by means of the pulleys 124 shown in the Figure 3. The cables 28 continue to the pilot's control in the pilot's cockpit. The pilot's cockpit controls and the run of the cables 28 from the shaft 22 to the pilot's control handles are not shown.

The wing 2 is similarly supported on the shaft 22 at the inboard end of the said wing on the shaft 22 by means of the bearing 16.

Figure 19:
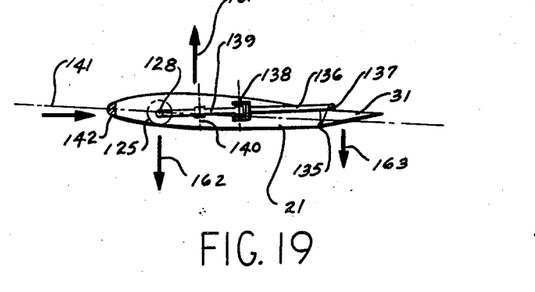
Figure 19 is a sectional view taken on the line 19—19 in the Figure 2.

The general arrangement of the main lifting rotor is shown in Figures 2, 11, and 19. Its operation, controlling means and construction are identical, to my co-pending patent application for Helicopter Rotor, Serial No. 310,607, filed September 20, 1952, now Patent No. 2,776,718. A means of automatically feathering the rotor blades when the rotor rotation has ceased is added in this application, as is disclosed in Figure 2, in the form of the hinged counterweight 45 and the bungee cords 44.

Figure 18:
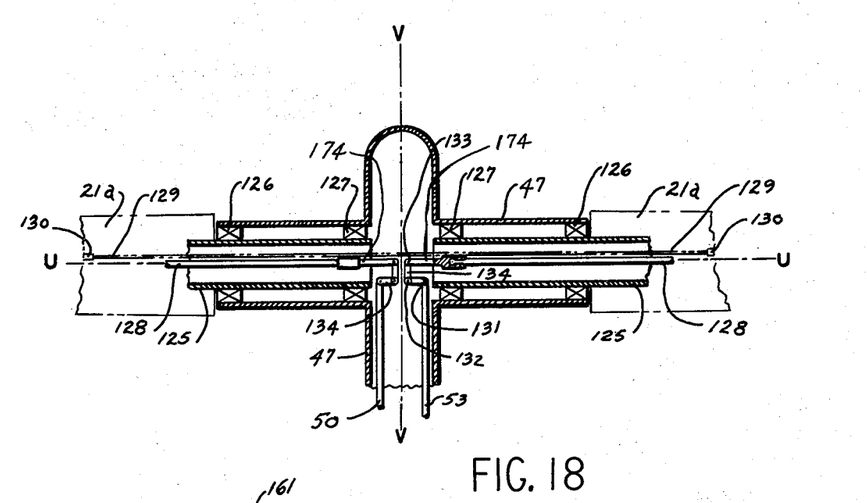
Figure 18 is a fragmental sectional view taken on the line 18—18 in the Figure 3.

The Figures 18 and 19 essentially duplicate the Figures 2 and 3 in the said co-pending application, Serial No. 310,607.

In the Figures 2, 11, 18, and 19 of this disclosure, the hub 47 swingably supports the blades 21 by means of the hollow shafts 125 which are supported on the bearings 126 and 127 within the said hub 47. During rotation of the rotor there is an axial thrust on the bearings 126 and 127 due to the centrifugal forces imposed by the blades 21. The said thrust on the said bearings 126 and 127 is relieved by the tension member 129 which is secured to the blades 21 by means of the fittings 130.

In the Figure 18 the push-pull rods 50 and 53 carry the pilot's control movement to the rotor blades for the control of the rotor. The said rods 50 and 53 reach the pilot's control in the cockpit thru the conventional helicopter control means consisting of push-pull rods, bell cranks and a wobble plate, and are therefore not shown in the drawings.

The rods 50 and 53 are connected to the bell cranks 134 by the means of the pins 131. The pins 132 hingeably support the bell cranks 134. The pins 132 are fixedly secured to the hub 47. The push-pull rods 128 are attached to the other end of the bell cranks 134 by means of the pins 133.

As is obvious in the Figure 19, the rods 128 lead outboard from the hub center to the control bell crank 139 and swingably connect thereto. The said bell crank 139 is rockable in substantially the chordwise plane 141 on the pin 140 which is fixedly secured to the rotor blade 21. Movement of the bell crank 139 in the chord plane of 141 transmits a movement to the aerodynamic control surface 31 thru the control link 136. The control link 136 is pinned to the bell crank 139 at 138 and to the control surface 31 at the pin 137. The control surface 31 in swingably attached to the rotor blade 21 by means of the piano type hinge 135.

In Figure 19 the blade 21 is statically balanced by means of the counterweight 142 which is securely fixed to the said blade 21. The counterweight 142 is composed of a high density metal for maximum effectiveness as a counterweight.

In the Figure 2 the inboard leading edge of the blade is made up with a segment 45 of the counterweight on a pin 46 enabling the said counterweight segment 45 to rotate into the position 45a. The said pin 46 is securely fixed to the blade 21 and swingably supports the counterweight segment 45.

The bungee 44 is an elastic cord with one end fixedly secured to the blade body 21 and the other end anchored to the counterweight segment 45 and constantly applies a rotational force on the said segment 45 to rotate the said segment 45 to the position 45a.

When the segment 45 is in the position 45a there is an overbalancing force on the balancing forces about the axis U—U as is apparent in the Figures 2 and 19. There is thus an ever present force tending to tilt the blades 21 into the position shown in the Figures 1, 2, 3, 4 and 5 which is the feathered and cruising airplane flight attitude.

When the rotor blades 21 rotate about the axis V—V the segments 45 do not exert a feathering force on the said blades 21. When the rotor rotates on its substantially upright axis V—V an ever present centrifugal force keeps the segment 45 faired smoothly into the leading edge of the blade 21 so that there is no longer an overbalancing tendency of the airfoil to rotate it into the feathered position.

Figure 4:
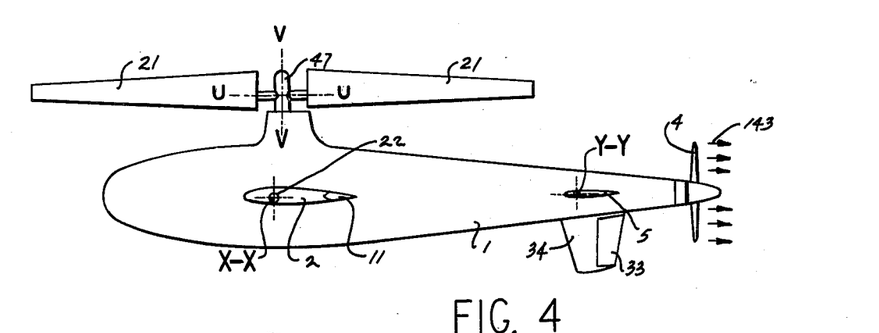
Figure 4 is a diagrammatical side view of the aircraft illustrating the conventional airplane flight configuration.
Figure 5:
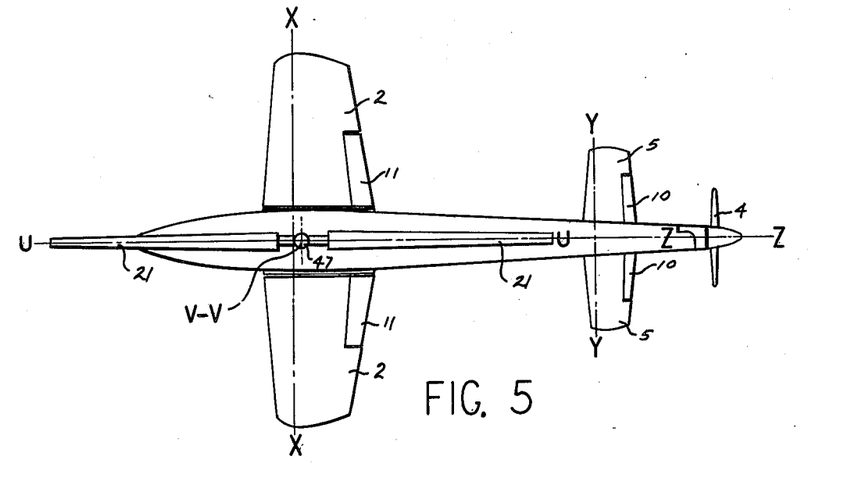
Figure 5 is the same diagrammatical aircraft shown in the plan view illustrating the conventional airplane flight configuration.

In the Figures 4 and 5 is diagramatically disclosed the configuration for airplane flight. The blades 21 are feathered into the fore and aft position and the foreward thrust force for airplane flight is derived from the propeller 4 as is evidenced by the air streamlines 143.

Figure 6:
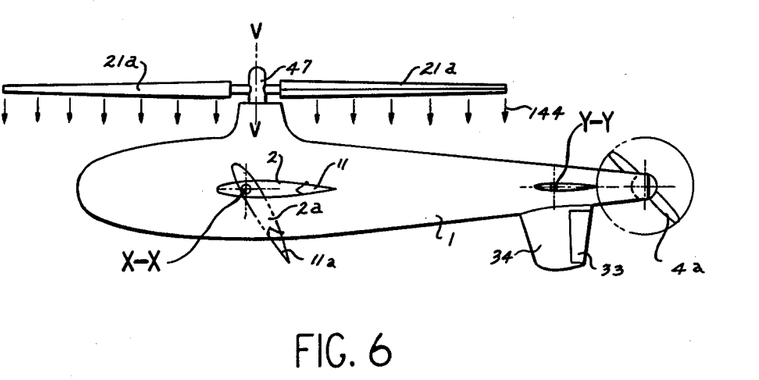
Figure 6 is a diagrammatical side view of the aircraft in the conventional helicopter flight configuration.
Figure 7:
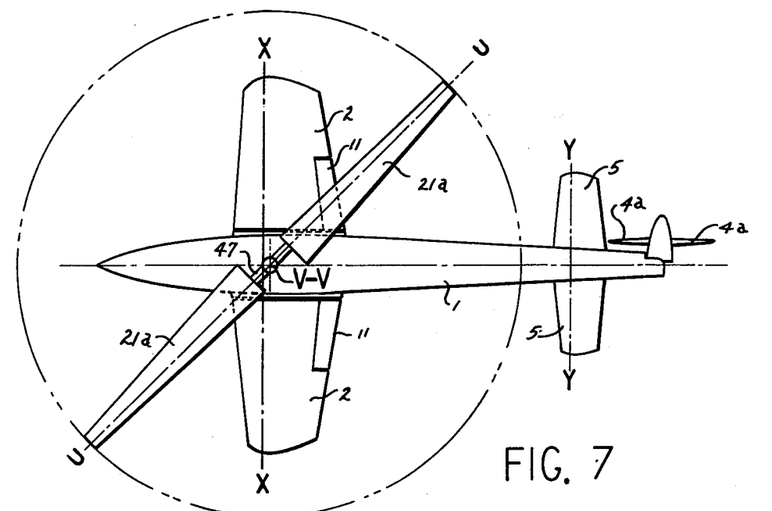
Figure 7 is the same diagrammatical aircraft shown in the plan view illustrating the conventional helicopter flight configuration.

In the Figures 6 and 7 the aircraft is shown diagrammatically in the helicopter configuration. The propeller 4 is rotated to the side permitting the propeller to rotate into the position of 4a which is parallel to the longitudinal center line of the fuselage 1. The rotor is unfeathered and is in rotation about the axis V—V forcing a flow of air 144 downward and creating an upward lift. The downward flow of air automatically rotates the wing 2 to a position 2a which is more compatible with the direction of airflow 144 from the rotor blades 21a. The propeller 4a in this configuration produces a thrust oppositely to the torque of the rotor blades 21a and thus becomes an anti-torque rotor for the helicopter flight period.

Figure 8:
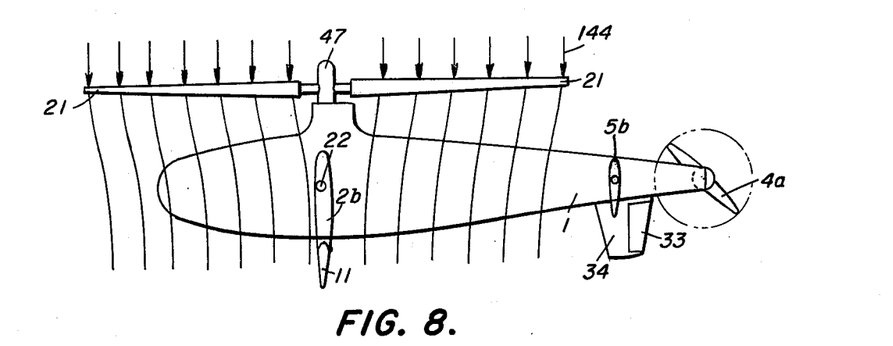
Figure 8 is a diagrammatical side view of the aircraft identical to Figure 6 and illustrating the downward airstreamlines from the helicopter rotor when the aircraft is hovering.

In Figure 8 is shown in more complete form the diagrammatic illustration of the airflow when the helicopter configuration is hovering. The vertical airflow from the rotor rotates the wing 2 to the 2b position directly in line with the airflow 144. The horizontal control surfaces at the tail also seek out the relative airflow at the tail and adjust the surface 5 to the position of 5b approximately.

Figure 9:
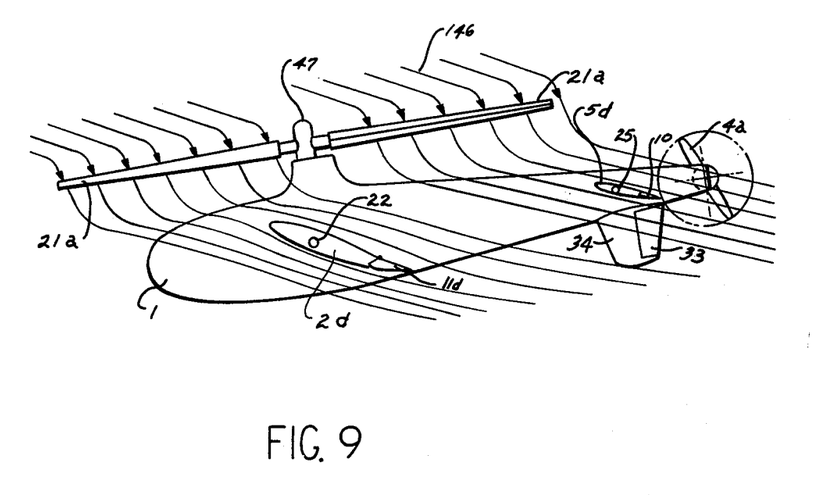
Figure 9 is a diagrammatical side view of the aircraft identical to Figures 6 and 8 showing the aircraft in conventional helicopter horizontal flight and the resulting airflow.

In the Figure 9 is shown diagrammatically an approximation of the airflow 146 as the helicopter configuration translates horizontally from the hovering attitude of Figure 8. As is obvious, the wing 2 again adjusts its attitude to the airflow 146 to the position 2d, and the horizontal surface 5 does likewise adjust its attitude and into the position 5d. It is thus obvious that the wings 2 and the horizontal tail 5 are continually and automatically seeking the direction of the airflow, which is directly influenced by the rotor 21 and the flight speed and attitude of the aircraft; and the said wings 2 and tail surfaces 5 are at all times effective in their function as lifting and control elements, since the airflow never places the said wings 2 and tail surfaces 5 in a relatively stalled attitude with respect to the said airflow.

Figure 10:
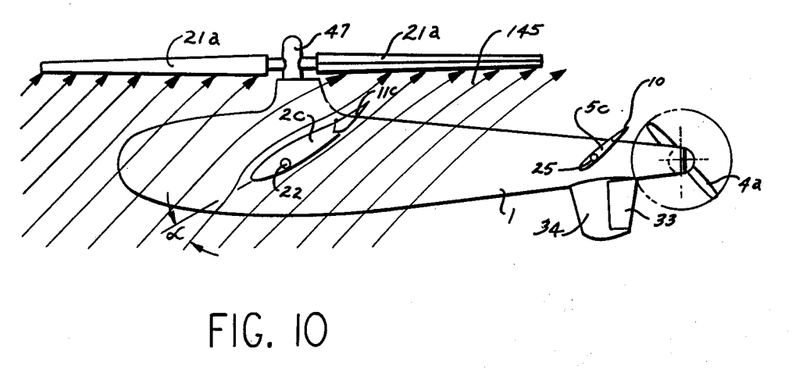
Figure 10 is a diagrammatical side view of the aircraft identical to the Figures 6, 8 and 9 showing the aircraft in conventional helicopter auto-rotation flight and the resulting airflow.

During autorotation of the helicopter rotor the airflow reverses and flows as is shown in the Figure 10 and the airflow is indicated as 145. The wings 2 and the horizontal tail surfaces 5 now automatically change attitude to the new direction of the flowing air and these airflows again remain effective on the lifting and control elements in the aircraft when the said aircraft is flown in the helicopter configuration.

My convertiplane as herein disclosed can accomplish the following functions interchangeably:

(1) It can takeoff and land vertically, and be flown continuously as a helicopter, or;

(2) It can takeoff vertically at zero forward velocity using helicopter flight procedure, and then convert to fly horizontally at very high speed using airplane flight procedure and airplane wings, and it can convert back again to land vertically using helicopter flight procedure, or;

(3) It can takeoff and land as a conventional airplane, and be flown continuously as a conventional airplane, or;

(4) It can land in emergencies with a dead engine either by auto rotation as a helicopter, or autogiro procedure, or;

(5) It can land in emergencies with the main rotor 21 feathered, and the engine dead, using airplane wings in the conventional airplane landing procedure.

The pilot's operational procedure in flying the convertiplane is as follows:

(a) Takeoff procedure:

(1) Turn the tail propeller 4 to the anti-torque rotor position 4a in Figures 3, 6 and 7, (2) Unfeather the large rotor 21 which requires the releasing of the rotor shaft brake 62 in Figure 11 and moving the rotor aerodynamic control surface 31 for positive pitch rotation of the surface 31 in Figure 19, (3) Start the engine 36 in the Figure 11, (4) By means of the clutch 38, engage the drive to the rotor 21 and propeller 4 in Figure 11 and then speed up the rotor 21 and the propeller 4 to takeoff and flight revolutions per minute, (5) The convertiplane will now takeoff, fly, and land using conventional helicopter flight procedure.

(b) The procedure for conversion from helicopter flight to airplane flight while in the air:

(1) At about 500 feet altitude with the convertiplane in a nose down attitude as in Figure 9, and having speed sufficient for airplane flight, release the clutch 38 and the engine power 36 to the main rotor 21 and the anti-torque rotor 4a (the plane now flies as an autogiro with the rotor autorotating and the airplane wings 2 sharing in the lift of the convertiplane), (2) Now rotate the anti-torque rotor 4a to the tail propeller position 4, as shown in the Figures 3, 4, 5, 11 and 12, and by the means of the control 49 adjust the aerodynamic control surface 83 to rotate the propeller 4 to provide a pusher propelling force to the convertiplane as shown in the Figures 4, 5 and 16, (3) Release the gear drive engagement to the rotor drive, moving the gear 57 to position 57a in the Figure 11, (4) Re-engage the engine 36 drive to the propeller 4 thru the clutch 38, (5) Apply full engine 36 power, (6) Place the convertiplane into a climbing attitude, (7) Reduce the rotor 21 pitch to a no-lift position to stop autorotation of the said rotor, (8) When the said rotor 21 rotates slowly apply braking pressure thru the brake 62 to stop rotation of the said rotor 21 in a fore and aft position as shown in the Figures 2, 3, 4 and 5, (9) When the rotor 21 has stopped rotating the counterweights 45 are forced to the position 45a by the bungee chords 44, and this overbalancing weight automatically feathers the rotor blades to the position shown in the Figures 1, 2, 3, 4 and 5, (10) The convertiplane now flies like a conventional airplane and it may be landed and again taken off again using the conventional airplane flight procedure.

(c) The procedure for converting from airplane flight to helicopter flight while in the air:

(1) At about 500 feet altitude, and at a minimum speed sufficient for airplane flight, place the convertiplane into a slightly climbing attitude, (2) Unfeather the large rotor 21 which includes releasing the braking pressure of the brake 62 and adjusting the areodynamic control surface 31 into a position to rotate the rotor into a positive lift pitch position as shown in Figures 11 and 19, (3) Autorotation of the rotor 21 will now begin and the counterweights 45a will take the position 45 thru the action of centrifugal force due to the rotation of the said rotor 21, (4) When the full required revolutions per minute of the rotor 21 have been attained thru autorotation of the said rotor 21 the engine 36 throttle is closed, (5) The clutch 38 is released to sever the engine 36 power drive to the propellor 4 (the convertiplane now glides as an autogiro), (6) Rotate the tail propeller 4 to the anti-torque position 4a shown in Figure 12 by arrow 152, (7) Engage the large rotor drive gear 57a by moving the said gear to the position 57, (8) Re-engage the clutch 38 now driving the large rotor 21 and the anti-torque propeller 4a, (9) The convertiplane now flies as a conventional helicopter.

The wings 2, the propeller blades 4, the rotor blades 21, and the horizontal tail 5 consist of airfoils which have substantially zero travel of the center of lift. In my Patent No. 2,347,230 in the Figure 4 is shown the equivalent to the Figure 20 of this disclosure. The wings 2 of this said disclosure in the said Figure 20 are swingably supported forward of the center of lift 171, and the airplane weight 170 acts downward on the shaft 22. This system of forces is retained in proper balance by the force 172 which is created by the aerodynamic control surface 11 and varied by the pilot through the movement of the said surface from the position 11 to the position 11a. The angle of attack $\alpha$ to the relative direction of the airflow is varied by the magnitude of the force 172 which is directly controlled through the movement of the control surface 11 through the positions of 11 and 11a.

In the Figure 14 of this application is shown the propeller 4 and its aerodynamic balancing forces. It is similar to the wing in the Figure 20. The center of lift of the propeller 4 is at 165 which is aft of the pivoting axis T—T which is co-axial with rod 94. The force 165 is again retained in balance by the force 164 which is created by the aerodynamic surface 83 and directly controlled by the pilot.

In the Figure 17 of this application is shown the horizontal tail surface airfoil 5. The said airfoil 5 is symmetrical and has a center of lift at 158 and this lift force is applied at 159 on the shaft 25 through the bearings 24 which swingably supports the said airfoil 5. These forces are retained in balance by the aerodynamic control surface 10 in the position 10b which creates the force 160. When the said surface 10 is pilot-moved to the position 10a, the airfoil 5 moves to a position of an angle of attack to the airflow to create the lift 158a which will support a tail force 169a.

The basic notable and common aerodynamic consideration in the wings 2, the rotor blades 21, the propeller blades 4, and the horizontal tail 5 is the automatic manner in which the said airfoils constantly float into the relative and ever changing direction of the airflow.

In the Figure 14 the thrust of the propeller 4 is varied by changing the pitch angle of the said propeller 4. The arrow 167 is the forward velocity of the convertiplane, 166 and 168 are the rotational velocity of the blade at the section of the propeller considered, and 169 is the vectorial resultant wind direction of the said forward velocity 167 and the said rotational velocity 168. The angle of the propeller airfoil to the said vectorial resultant wind direction 169 determines the magnitude of the propeller thrust, and the said angle is controlled by the aerodynamic surface 83 which is directly controlled by the pilot.

The Figure 19 of this application is identical to the Figure 3 in my application of Serial No. 310,607, Helicopter Rotor, which is a companion application to this disclosure. Again the rotor blade 21 has a center of lift 161 aft of the pivoting axis U—U where the weight 162 of the convertiplane is supported. These forces are retained in balance by the force 163 which is created by the aerodynamic surface 31. The said force 163 is varied by the pilot's control of the said surface 31 and thereby controls the pitch angle and the lift of the rotor 21.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Having described my invention, what I claim as new and desire to secure by Letters Patent is:

1. A combination aircraft for helicopter and airplane flight simultaneously or separately, which aircraft includes: an airplane including a fuselage with a rotor mounting pylon projecting from the upper part, airplane flight propulsion means and engine means; a helicopter rotor mounted on said pylon to rotate about a vertical rotor rotation axis, said rotor being comprised of two blades oppositely extending from said rotor rotation axis, said blades being freely rotatable about blade rotation axes transverse to said rotor rotation axis and passing through said blades forward of the center of lift thereof; wings and tail surfaces for airplane flight mounted on said fuselage, said wings and tail surfaces being rotatable under the air draft from said rotor to a feathered position during helicopter flight; pilot-controlled brake means for holding said rotor in alignment with the longitudinal axis of said fuselage during airplane flight; moveable counterweights mounted in said rotor blades, and moveable by centrifugal force to a retracted helicopter flight position from an extended airplane flight position, said counterweights being adapted to rotate said blades about said blade rotation axis into a vertical feathered position when said counterweights are in said extended position, and resilient means urging said counterweights into extended position.

2. A combination aircraft for helicopter and airplane flight simultaneously or separately, which aircraft includes: a fuselage with a rotor mounting pylon projecting from the upper part; a helicopter rotor mounted on said pylon to rotate about a vertical rotor rotation axis, said rotor being comprised of two blades oppositely extending from said rotor rotation axis, said blades being freely rotatable about blade rotation axes transverse to said rotor rotation axis and passing through said blades forward of the center of lift thereof; wings and tail surfaces for airplane flight mounted on said fuselage, said wings and tail surfaces being rotatable under the air draft from said rotor to a feathered position during a helicopter flight, airplane propeller means for propelling said aircraft during airplane flight; pilot-controlled means for rotating the mounting of said airplane propeller to a rotor torque resisting position during helicopter flight; pilot-controlled brake means for holding said rotor in alignment with the longitudinal axis of said fuselage during airplane flight; moveable counterweights mounted in said rotor blades, and moveable by centrifugal force to a retracted helicopter flight position from an extended airplane flight position, said counterweights being adapted to rotate said blades about said blade rotation axis into a vertical feathered position when said counterweights are in said extended position, and resilient means urging said counterweights into extended position.

3. A combination aircraft for helicopter and airplane flight simultaneously or separately, which aircraft includes: a fuselage having a rotor mounting pylon projecting from the upper part; a helicopter rotor mounted on said pylon to rotate about a vertical rotor rotation axis, said rotor being comprised of two blades oppositely extending from said rotor rotation axis, said blades being freely rotatable about a blade rotation axes transverse to said rotor rotation axis, and passing through said blades forward of the center of lift thereof; pilot-controlled control surfaces at the trailing edges of said rotor blades; a pair of counterweight arms, one along the leading edge of each of said rotor blades, each of said arms having its inboard end hinge-attached to the leading edge of said rotor blade to make the outboard end of said arm swingable between a retracted position along said leading edge and an extended position forward of said leading edge; a counterweight at the outboard swinging end of each of said counterweight arms, said counterweights being sufficiently heavy in relationship to the weight of said blades to swing said blades into a vertically feathered position when said counterweight arms are swung from their retracted positions to their extended positions; resilient means for urging said counterweight arms into said extended feathering position against the influence of centrifugal force, but weak enough to permit retraction of said arms by centrifugal force during helicopter flight; airplane flight surfaces, including airplane wings, mounted on said fuselage to be freely rotatable to a substantially vertical feathered position about axes transverse to said fuselage during helicopter flight, said rotation being produced by the downward air stream from said rotor; propeller means for airplane flight; engine means for driving said rotor and said propeller; clutch means for disengaging said engine means from said rotor; and brake means for bringing said rotor blades to stop in alignment with the longitudinal axis of said fuselage.

4. A combination aircraft for helicopter and airplane flight simultaneously or separately, which aircraft includes: a fuselage with a rotor mounting pylon projecting from the upper part; a pair of wings, one extending from each side of said fuselage, said wings being freely rotatable about a wing rotation axis transverse to said fuselage, said wing rotation axis being located forward of the center of lift of said wings, said wings being feathered into the downward airstream by the rotor air draft during helicopter flight; hinged control surfaces at the trailing edge of said wings, said control surfaces being pilot controlled during airplane flight, said control surfaces being feathered into the downward airstream by the rotor air draft during helicopter flight; a pair of tail surfaces, one extending from each side of the tail of said fuselage, said tail surfaces being freely rotatable about a tail surface rotation axis transverse to said fuselage, said tail surface rotation axis being forward of the center of lift of said tail surfaces, said tail surfaces being feathered into the downward airstream by the rotor air draft during helicopter flight; hinged control surfaces at the trailing edge of said tail surfaces, said control surfaces being pilot controlled during airplane flight, and said control surfaces being feathered into the downward airstream by the rotor air draft during helicopter flight; propeller mounting means mounted near one end of said fuselage and rotatable about a vertical axis by the pilot; a propeller mounted in said propeller mounting means, and adapted to be driven in rotation about a horizontal axis; a helicopter rotor mounted on said pylon to rotate about a vertical rotor rotation axis, said rotor being comprised of two blades oppositely extending from said rotor rotation axis, said blades being freely rotatable about a blade rotation axes longitudinal with respect to said blades and transverse to said rotor rotation axis, and passing through said blades forward of the center of lift of said blades; pilot-controlled control surfaces at the trailing edges of said blades; engine and clutch means for driving said rotor and said propeller during helicopter flight and said propeller during airplane flight; a pair of counterweight arms, one along the leading edge of each of said rotor blades, each of said arms having its inboard end hinge-attached to the leading edge of said rotor blade to make the outboard end of said arm swingable between a retracted position along said leading edge and an extended position forward of said leading edge; a counterweight at the outboard swinging end of each of said counterweight arms, said counterweights being sufficiently heavy in relationship to the weight of said blades to swing said blades into a vertically feathered position when said counterweight arms are swung from their retracted positions to their extended positions; resilient means for urging said counterweight arms into said extended feathering position against the influence of centrifugal force, but weak enough to permit retraction of said arms by centrifugal force during helicopter flight; brake means for holding said rotor blades in alignment with the longitudinal axis of said fuselage during airplane flight.

References Cited in the file of this patent
UNITED STATES PATENTS

| | | |
|---|---|---|
| 1,589,658 | Pescara | June 22, 1926 |
| 1,779,524 | Zaschka | Oct. 28, 1930 |
| 1,802,226 | Torkelson | Apr. 21, 1931 |
| 1,827,304 | Thurston | Oct. 13, 1931 |
| 2,347,230 | Zuck | Apr. 25, 1944 |
| 2,420,764 | Zuck | May 20, 1947 |
| 2,580,312 | Moore | Dec. 25, 1951 |
| 2,587,359 | Milans | Feb. 26, 1952 |
| 2,776,718 | Zuck | Jan. 8, 1957 |